(12) United States Patent
Kamble

(10) Patent No.: US 11,210,262 B2
(45) Date of Patent: Dec. 28, 2021

(54) DATA INGESTION APPLICATION FOR INTERNET OF DEVICES

(71) Applicant: SAP SE, Walldorf (DE)

(72) Inventor: Dishant Kamble, Vadodara (IN)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 16/582,555

(22) Filed: Sep. 25, 2019

(65) Prior Publication Data
US 2021/0089496 A1    Mar. 25, 2021

(51) Int. Cl.
| | | |
|---|---|---|
| *G06F 7/00* | (2006.01) | |
| *G06F 16/11* | (2019.01) | |
| *H04L 29/08* | (2006.01) | |
| *G06F 16/906* | (2019.01) | |
| *G06F 16/903* | (2019.01) | |
| *G06F 16/9035* | (2019.01) | |
| *H04L 29/06* | (2006.01) | |

(52) U.S. Cl.
CPC .......... *G06F 16/119* (2019.01); *G06F 16/906* (2019.01); *G06F 16/9035* (2019.01); *G06F 16/90335* (2019.01); *H04L 67/125* (2013.01); *H04L 67/42* (2013.01)

(58) Field of Classification Search
CPC ............. G06F 16/119; G06F 16/90335; G06F 16/9035; G06F 16/906; G06F 16/185; G06F 16/214; H04L 67/125; H04L 67/42
See application file for complete search history.

(56) References Cited

U.S. PATENT DOCUMENTS

| | | | |
|---|---|---|---|
| 9,306,965 B1* | 4/2016 | Grossman | H04L 63/1425 |
| 10,592,525 B1* | 3/2020 | Khante | G06F 16/245 |
| 10,671,443 B1* | 6/2020 | Ramachandran | G06F 9/546 |
| 10,791,063 B1* | 9/2020 | Florissi | H04L 67/12 |
| 2010/0036923 A1* | 2/2010 | Byrne | G06Q 10/107 709/206 |
| 2013/0103837 A1* | 4/2013 | Krueger | G06F 9/5072 709/226 |
| 2014/0075506 A1* | 3/2014 | Davis | H04L 63/0209 726/3 |
| 2016/0212099 A1* | 7/2016 | Zou | H04L 63/0263 |
| 2017/0060574 A1* | 3/2017 | Malladi | G06F 9/542 |
| 2017/0284691 A1* | 10/2017 | Sinha | F24F 11/62 |
| 2018/0084073 A1* | 3/2018 | Walsh | H04L 67/2819 |

(Continued)

*Primary Examiner* — Mohammed R Uddin
(74) *Attorney, Agent, or Firm* — Fountainhead Law Group P.C.

(57) ABSTRACT

In some embodiments, an ingestion service processes messages from a set of devices that generate a first set of messages. The ingestion service is configured with a first profile for a first platform. First configuration properties in the first profile configure a first connection to first storage on the first platform to store information for the first set of messages and configure a first connection to a first event processing service on the first platform to process information in the first set of the messages. A selection is received for a second profile. The ingestion service is migrated to a second platform associated with the second profile. Second configuration properties are retrieved from the second profile for the second platform and installed on the ingestion service to configure a second connection to second storage and configure a second connection to a second event processing service on the second platform.

20 Claims, 6 Drawing Sheets

(56) References Cited

U.S. PATENT DOCUMENTS

| | | | |
|---|---|---|---|
| 2018/0095155 A1* | 4/2018 | Soni | G08G 5/0086 |
| 2018/0144034 A1* | 5/2018 | Das | H04L 67/2823 |
| 2018/0173583 A1* | 6/2018 | Braundmeier | G06F 11/0781 |
| 2018/0196867 A1* | 7/2018 | Wiesmaier | G06F 16/285 |
| 2018/0246944 A1* | 8/2018 | Yelisetti | G06F 16/258 |
| 2018/0295187 A1* | 10/2018 | Sabata | G08C 17/02 |
| 2018/0300124 A1* | 10/2018 | Malladi | H04L 12/2823 |
| 2019/0073286 A1* | 3/2019 | Kambaloor | G06N 20/00 |
| 2019/0095494 A1* | 3/2019 | Bhattacharjee | G06F 11/3086 |
| 2019/0098089 A1* | 3/2019 | Shim | H04L 67/12 |
| 2019/0226898 A1* | 7/2019 | Gray, Jr. | H04W 84/18 |
| 2019/0228078 A1* | 7/2019 | Tucker | H04L 67/1097 |
| 2019/0243352 A1* | 8/2019 | Horgan | G05B 23/0235 |
| 2019/0244129 A1* | 8/2019 | Tabuchi | G06F 9/5033 |
| 2019/0364117 A1* | 11/2019 | Rogynskyy | G06F 16/2379 |
| 2019/0377817 A1* | 12/2019 | McCluskey | G06F 16/258 |
| 2020/0067789 A1* | 2/2020 | Khuti | G06F 16/88 |
| 2020/0081916 A1* | 3/2020 | McShane | G06F 3/0486 |
| 2020/0133748 A1* | 4/2020 | Liebherr | H04L 67/34 |
| 2020/0204465 A1* | 6/2020 | Baker | H04L 67/16 |
| 2020/0336570 A1* | 10/2020 | Harper | H04L 12/46 |
| 2021/0006636 A1* | 1/2021 | Koehler | H04L 67/2823 |

\* cited by examiner

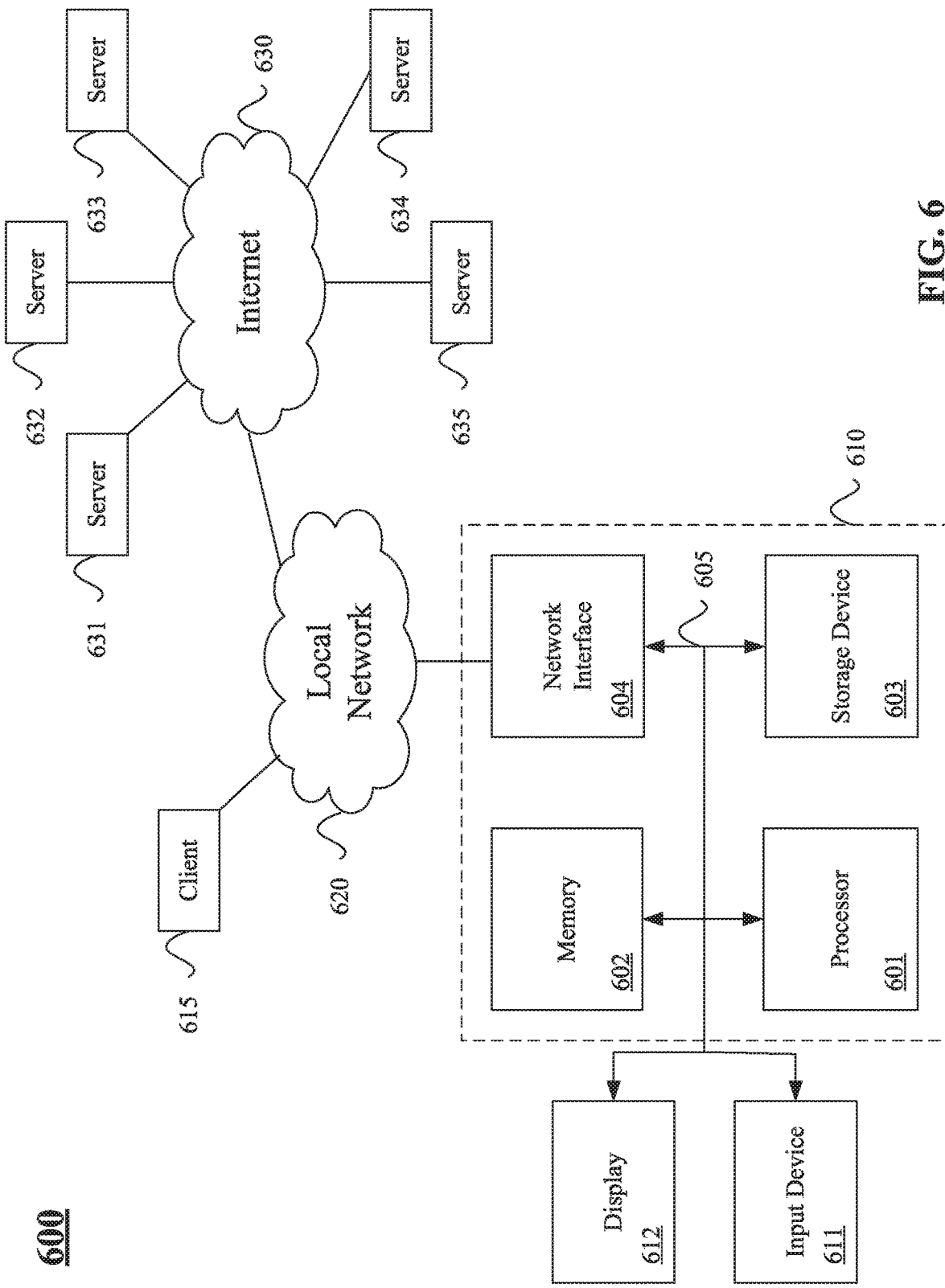

DATA INGESTION APPLICATION FOR INTERNET OF DEVICES

BACKGROUND

An Internet of Things (IoT) may include IoT applications that include "things" (e.g., devices). The devices provide messages regarding information about the operation of the devices. For example, a refrigerator (e.g., thing) may send temperature data. The temperature data may be used to evaluate whether there is a problem with the refrigerator or not.

An IoT solution may be implemented in a cloud platform. The cloud platform may provide specialized components that can only be used in that cloud platform. For example, the cloud platform may include a cloud gateway that connects the devices to the cloud backend components. Additionally, the cloud platform may include stream processing components that may perform calculations on the data received, such as transformations and aggregations on the data. Then, the cloud platform may store the data in specialized storage of the cloud platform. The cloud platform thus limits a customer to using a single cloud platform and the IoT application cannot be translated into a multi-cloud environment. For example, customers are tightly bound to the offerings provided in the cloud platform, and cannot use components that are not supported by the cloud platform, such as the customer cannot use a specialized storage component that is not supported by the cloud platform.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 6 illustrates an example of special purpose computer systems according to one embodiment.

DETAILED DESCRIPTION

Described herein are techniques for an ingestion service. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments include an ingestion service that is not platform-specific to different cloud platforms. For example, the ingestion service may be installed in an independent unit, such as a container, workload, virtual machine, etc., that can be migrated from one cloud platform to another cloud platform. The ingestion service may process messages that are received from devices, such as Internet of Things (IoT) devices, that are connected to the cloud platform. The ingestion service may perform tasks on information from the messages, such as generating analytics from the information (e.g., transformation, aggregation, etc.). Then, the ingestion service may store the information in storage.

To allow the ingestion service to be portable to different cloud platforms, the ingestion service may be configured with multiple profiles that can be separately enabled to allow the ingestion service to store data on different cloud platforms. For example, if a customer wants to use a first type of storage on a first cloud platform, the customer can enable a first profile on the ingestion service. The ingestion service is then configured with configuration properties for the first cloud platform, and can interact with components on the first cloud platform, such as storing information on the first type storage in the first cloud platform. Then, if the customer wants to use a second cloud platform, the ingestion service can enable a second profile for the second cloud platform. Then, the ingestion service can use configuration properties for the second cloud platform to enable the ingestion service to interact with components on the second cloud platform, such as storing information from the messages on a second type of storage in the second cloud platform. The profile may also include different configuration properties for different components on each cloud platform.

Accordingly, using the ingestion service, an IoT application that can be deployed on multiple cloud platforms is provided. Additionally, the ingestion service may interact with different types of components on different cloud platforms, such as storage, without having to be re-written.

System Overview

Figure 1:
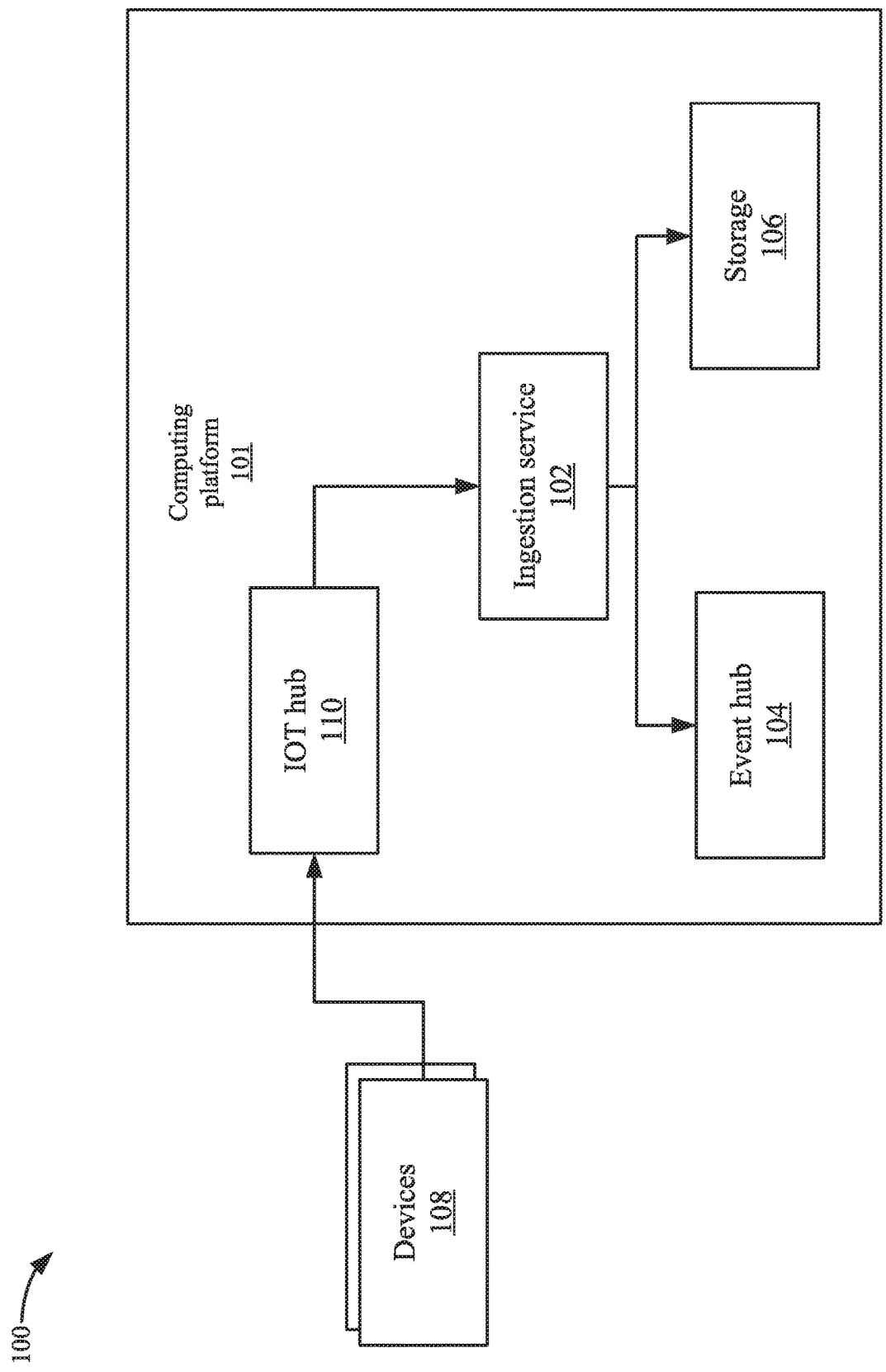
FIG. 1 depicts a simplified system for processing messages according to some embodiments.

FIG. 1 depicts a simplified system 100 for processing messages according to some embodiments. System 100 includes a computing platform 101 and devices 108. Computing platform 101 may be a cloud platform that that various customers may use to implement applications. The cloud platform may be offered by a provider that is a different legal entity from the customers. That is, the customers may pay the cloud provider for use of the cloud platform. As will be described later, other cloud platforms offered by other providers may be used by the customer.

Devices 108 may be computing devices, such as Internet of Things (IoT) devices, that may send messages to computing platform 101. The messages may include information, such as information regarding the operation of devices 108. Examples of some messages include sending temperature readings, on/off times, and other operational data.

Computing platform 101 includes an ingestion service 102, an event hub 104, storage 106, and an IoT hub 110. IoT hub 110 may be a gateway that connects to devices 108. In some embodiments, IoT hub 110 may be a specialized component that is provided by the cloud platform. IoT hub 110 allows devices 108 to securely connect to components within computing platform 101. IoT hub 110 may ingest events from devices 108 and act as a message broker between devices 108 and backend components of computing platform 101. For example, computing platform 101 may include multiple IoT hubs 110 that receive messages from different sets of devices 108.

In some embodiments, ingestion service 102 is running on a computing environment that is an independent computing unit in which the application for ingestion service 102 runs. For example, ingestion service 102 may be running in a container, a virtual machine, etc. The computing environment may not be specific to computing platform 101 in that the computing environment may be instantiated on different computing platforms that are offered by different providers. For example, multiple providers may offer containers that can run applications.

Ingestion service 102 may connect to an appropriate IoT hub 110 to receive messages from devices 108. For example, ingestion service 102 may be responsible for processing messages for a set of devices 108. Ingestion service 102 determines an IoT hub 110 that receives the messages from that set of devices 108. Ingestion service 102 can connect to IoT hub 110 using an event hub endpoint, an event hub path, and an IoT hub primary key. The event hub endpoint may identify a specific IoT hub 110, an event hub path may specify the specific IoT hub at the endpoint path, and IoT hub primary key may be the key that identifies the specific IoT hub.

Once receiving messages from IoT hub 110, ingestion service 102 may perform some tasks on the messages, such as transformation and aggregation tasks. Then, ingestion service 102 may store information from the messages in storage 106.

Storage 106 may be associated with computing platform 101. For example, computing platform 101 may offer storage 106 as a component of the cloud platform. In some embodiments, ingestion service 102 may include multiple profiles for different computing platforms. To use storage 106 on computing platform 101, ingestion service 102 selects the applicable profile for computing platform 101. The profile may include configuration properties to store information on storage 106. As will be discussed in more detail below, when another computing platform is used, ingestion service 102 may select another profile for that computing platform. Then, ingestion service 102 may use configuration properties for storage 106 on the other computing platform.

Event hub 104 may perform tasks on information from the messages, such as streaming analytics. Streaming analytics may be performed in real-time and may include applying rules to the data received from devices 108. Rules may include functions, database operations, etc. In some embodiments, event hub 104 may analyze information from the messages in real-time and determine actions to perform with devices 108 in real-time. For example, event hub 104 may analyze the temperature at some devices 108 and determine whether an action needs to be taken at devices 108. In some embodiments, event hub 104 may be specific to platform 101. In this case, ingestion service 102 may include a profile that includes configuration properties for event hub 104. If an event hub 104 on another computing platform 101 is used, ingestion service 102 may enable a second profile that includes configuration properties for the second computing platform 101.

Although storage and the event hub are discussed, configuration properties for other components on different computing platforms may be used. Accordingly, using the profiles, ingestion service 102 may be ported from one computing platform 101 to another computing platform 101. Additionally, since ingestion service 102 is running on an independent computing environment that is not specific to computing platform 101, ingestion service 102 can be ported to another computing platform 101.

Message Processing

Figure 2:
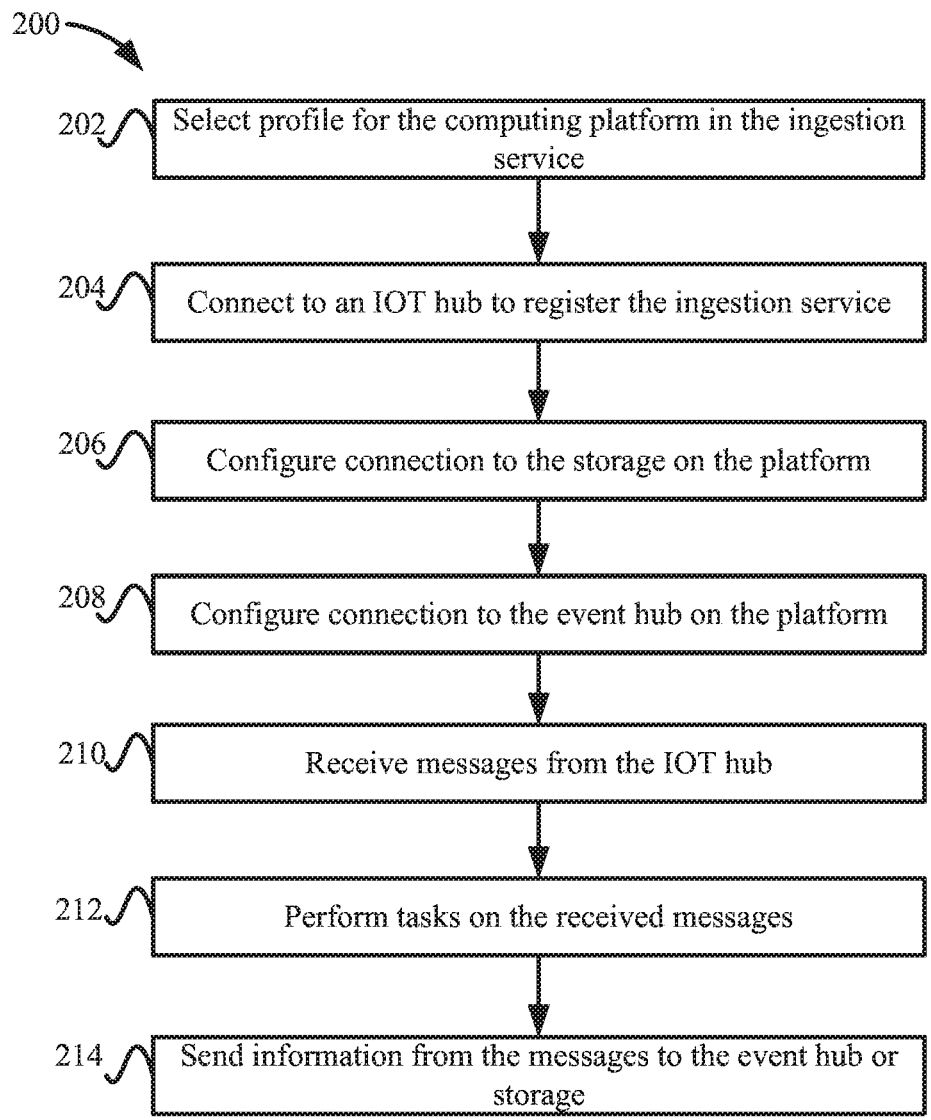
FIG. 2 depicts a simplified flowchart of a method for processing messages from devices 108 according to some embodiments.

The following will describe the message processing on a first computing platform 101. FIG. 2 depicts a simplified flowchart 200 of a method for processing messages from devices 108 according to some embodiments. At 202, ingestion service 102 selects a profile for the computing platform 101. For example, the profile for a computing platform in which storage 106 and event hub 104 are implemented is selected.

At 204, ingestion service 102 connects to IoT hub 110 to register ingestion service 102 to receive messages from IoT hub 110. For example, IoT hub 110 may be communicating with multiple devices 108 and ingestion services 102. Ingestion service 102 may determine the appropriate IoT hub 110 that is communicating with devices 108 in which ingestion service 102 wants to receive messages.

At 206, ingestion service 102 configures a connection to storage 106 on computing platform 101. Ingestion service 102 may use configuration properties in the selected profile to connect to storage 106. Also, at 208, ingestion service 102 configures a connection to event hub 104 on computing platform 101. Similarly, ingestion service 102 uses configuration properties in the selected profile to configure the connection.

At 210, after the above configuration, ingestion service 102 receives messages from IoT hub 110. For example, as devices 108 operate, devices may detect events and send messages including information for the events to IoT hub 110. Based on the registration of ingestion service 102 to receive messages from devices 108, IoT hub 110 may forward the messages to ingestion service 102.

At 212, ingestion service 102 may perform tasks on the received messages. For example, ingestion service 102 may perform transformation, aggregation, or other operations on information in the received messages. At 214, ingestion service 102 may send information from the messages to event hub 104 or storage 106. For example, ingestion service 102 may send results of some of the processing of the tasks and/or information for the messages for storage in storage 106. Also, ingestion service 102 may send results of some of the processing of the tasks and/or information from the messages to event hub 104 for real-time analytics processing.

Platform Change

Figure 3:
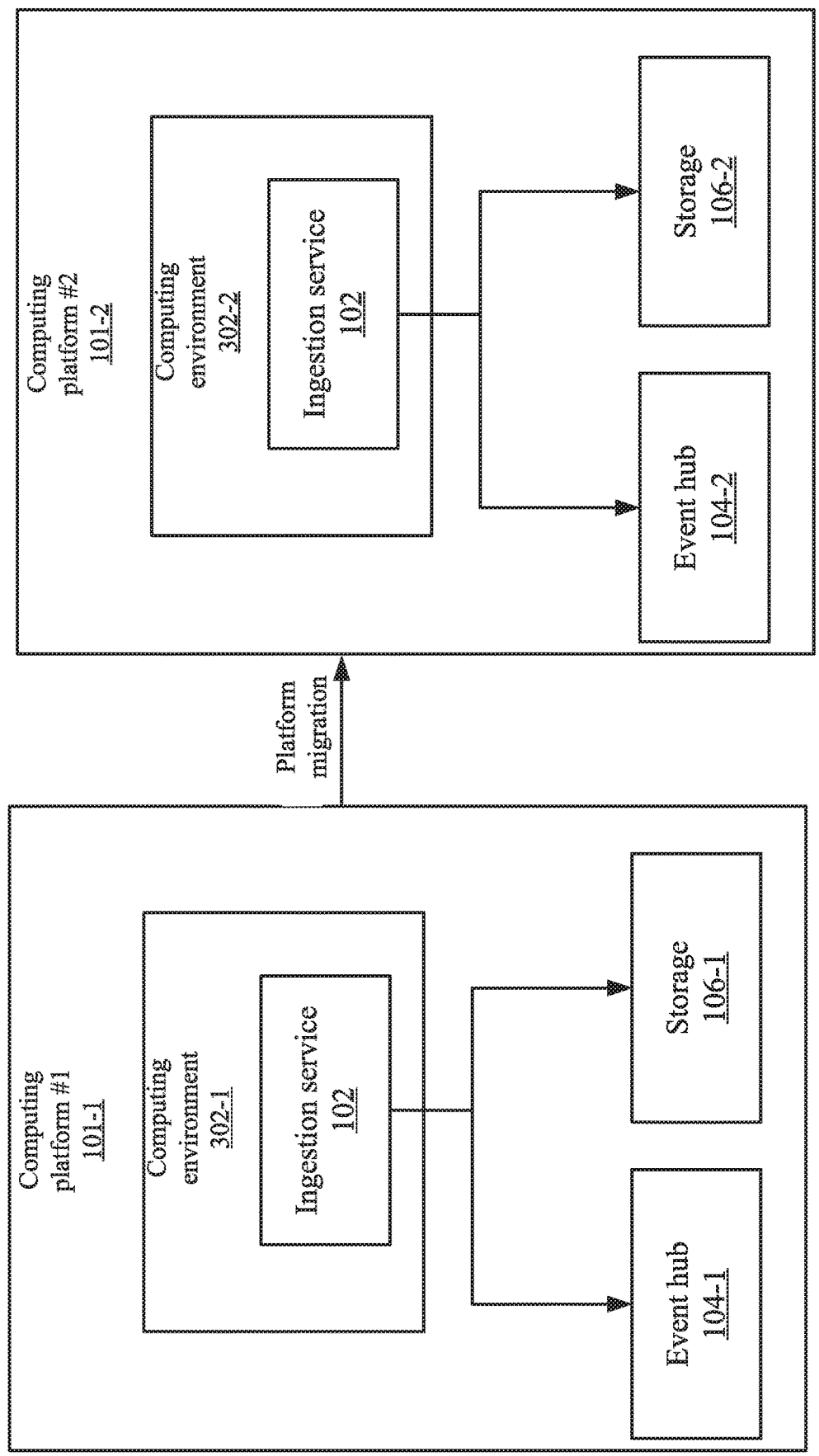
FIG. 3 shows the platform migration according to some embodiments.

At some point, ingestion service 102 may be migrated from a first computing platform 101-1 to a second computer platform 101-2. FIG. 3 shows the platform migration according to some embodiments. Ingestion service 102 may be operating in a computing environment 302-1. Computing environment 302-1 may be an independent computing environment that may be offered by both computing platform #1 101-1 and computing platform #2 101-2. For example, computing environment 302-1 and computing environment 302-2 may be containerized computing environments, virtual machines, etc.

To migrate ingestion service 102 from computing platform #1 101-1 to computing platform #2 101-2, computing platform #2 101-2 may generate a computing environment 302-2 and store ingestion service 102 in computing environment 302-2. Ingestion service 102 may then run in computing environment 302-2. Computing platform #2 101-2 may also offer versions of event hub 104-2 and storage 106-2. Event hub 104-2 may perform similar functions as event hub 104-1, but may be implemented differently in computing platform #2 101-2 compared to computing platform #1 101-1. That is, event hub 104-2 may still perform analytics on information from messages received from devices 108.

Storage 106-2 may store information from messages received from devices 108 similarly to storage 106-1. However, storage 106-2 may be implemented differently from storage 106-1. For example, storage 106-2 may be provided by a different storage provider compared to storage 106-1 and may use a different storage configuration.

Figure 4:
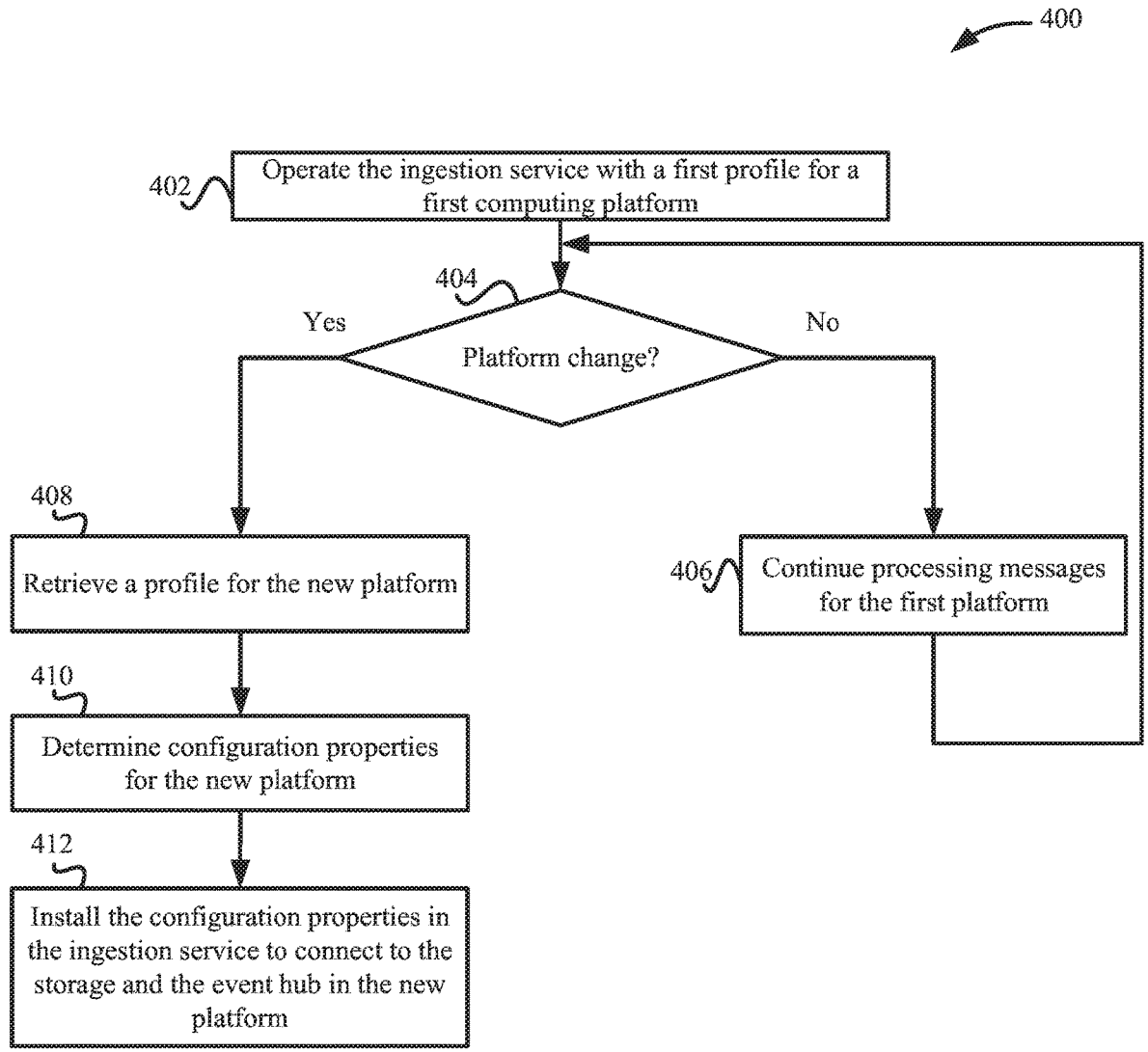
FIG. 4 depicts a simplified flowchart of a method for performing the computing platform migration according to some embodiments.

FIG. 4 depicts a simplified flowchart 400 of a method for performing the computing platform migration according to some embodiments. At 402, ingestion service 102 operates with a first profile for computing platform 101-1.

At 404, ingestion service 102 determines if a platform change request has been received. If not, at 406, ingestion service 102 continues to process messages for computing platform #1 101-1.

When a platform change request has occurred, at 408, ingestion service 102 retrieves a profile for computing platform #2 101-2. At 410, ingestion service 102 determines configuration properties for computing platform #2 101-2. The configuration properties may include information required to connect to storage 106-2 and event hub 104-2 in computing platform #2 101-2. Configuration properties may include, but are not limited to, hostnames, ports, secret keys, certificate locations, uniform resource locator (URLs), and credentials.

At 412, ingestion service 102 installs the configuration properties to connect to storage 106-2 and event hub 104-2 in computing platform #2 101-2. The installation may change the configuration properties that were installed for the prior profile #1 for computing platform #1 101-1. Installation may install an instance of ingestion service 102 to a new platform/environment with configuration properties of the underlying platform services, such as. IoT hub 110, event hub 104, storage 106, etc. based on the selected profile.

Figure 5:
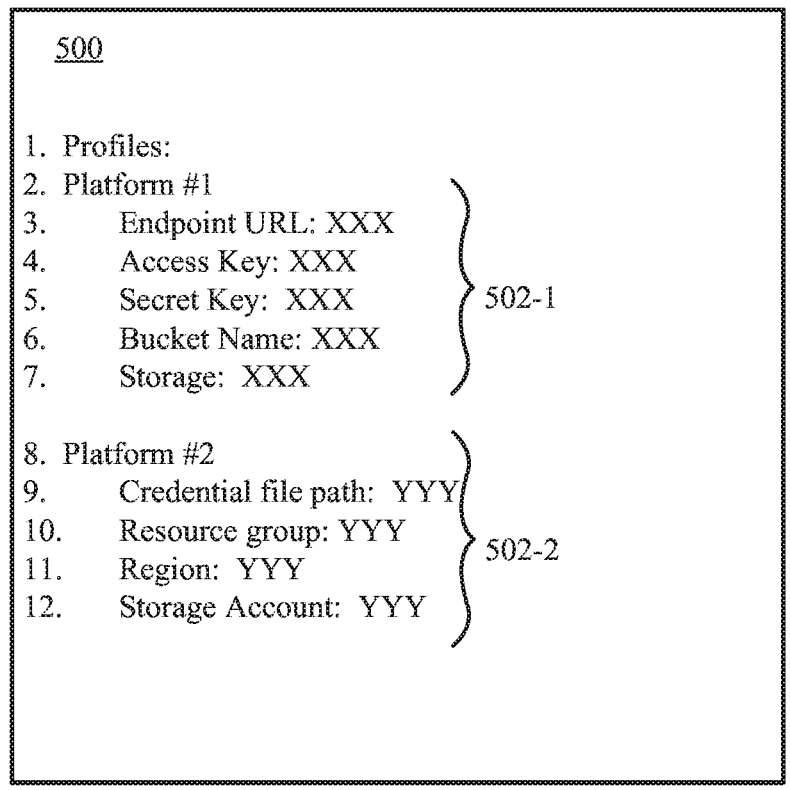
FIG. 5 depicts an example of software code implementing the profiles in ingestion service 102 according to some embodiments.

FIG. 5 depicts an example of software code 500 implementing the profiles in ingestion service 102 according to some embodiments. Migration refers to deploying/installing ingestion service 102 to a new computing platform. Based on the platform on which ingestion service 102 needs to be deployed/installed, the profile is selected and based on the profile respective configuration properties are loaded during the installation of the ingestion service 102 so as to be compatible with the respective underlying computing platform. Software code 500 includes a first profile 502-1 for a first computing platform 101-1 and a second profile 502-2 for a second computing platform #2 101-2. Each platform may have different configuration properties. For example, configuration properties for computing platform #1 102-1 include an endpoint uniform resource locator, an access key, a secret key, a bucket key, and storage. These configuration properties may allow ingestion service 102 to connect to event hub 104-1 and storage 106-1.

In the configuration properties for profile #2 at 502-2, the configuration properties include a credential file path, a resource group, a region, and storage account. These configuration properties allow ingestion service 102 to connect to event hub 104-2 and storage 106-2. Accordingly, ingestion service 102 can access information for different profiles based on the computing platform 101 that is enabled for ingestion service 102. Changes to the application of ingestion service 102 may not be required to switch to different computing platforms 101.

CONCLUSION

Ingestion service 102 may be storage- and platform-agnostic. By running in a computing environment that may be offered by multiple computing platforms, ingestion service 102 may be used with different storage options on different platforms. When migrating to a new computing platform, ingestion service 102 can run in the computing environment and by selection of a different profile, ingestion service 102 may connect to different storage options in the new platform. The above offers different options for a customer to deploy ingestion service 102. That is, ingestion service 102 is not bound to a particular platform and bound to use the services offered by that particular platform.

Example Embodiments

In some embodiments, a method includes: operating, by a computing device, an ingestion service to process messages from a set of devices that generate a first set of messages, wherein the ingestion service is configured with a first profile in a plurality of profiles for a first platform, and wherein first configuration properties in the first profile configure a first connection to first storage on the first platform to store information for the first set of messages and configure a first connection to a first event processing service on the first platform to process information in the first set of the messages; receiving, by the computing device, a selection for a second profile in the plurality of profiles; and migrating, by the computing device, the ingestion service to a second platform associated with the second profile, wherein second configuration properties are retrieved from the second profile for the second platform and installed on the ingestion service in the second platform to configure a second connection to second storage on the second platform and configure a second connection to a second event processing service on the second platform.

In some embodiments, the method further includes: prior to operating the ingestion service: receiving a selection for the first profile in the plurality of profiles; retrieving configuration properties for the first platform from the first profile; and installing the configuration properties for the first platform on the ingestion service to configure the first connection to the first storage on the first platform and configure the second connection the first event service on the first platform.

In some embodiments, the ingestion service stores the first configuration properties for the first profile and the second configuration properties for the second profile.

In some embodiments, the method further includes: receiving messages from the set of devices; and sending information from the messages to the first storage on the first platform or the first event service on the first platform.

In some embodiments, the method further includes: receiving messages from the set of devices; and performing one or more tasks on information from the messages.

In some embodiments, the method further includes: storing information in the first storage based on performing the one or more tasks.

In some embodiments, the method further includes: processing the information at the first event service based on a set of rules.

In some embodiments, the method further includes: upon migrating the ingestion service: receiving messages from the set of devices; and sending information from the messages to the second storage on the second platform or the second event service on the second platform.

In some embodiments, the method further includes: storing information in the second storage based on performing the one or more tasks.

In some embodiments, the method further includes: sending information to the second event service based on performing the one or more tasks.

In some embodiments, the method further includes: connecting to a hub that is a connection point for the set of devices to receive messages from the set of devices via the hub.

In some embodiments, the method further includes: installing the ingestion service in a computing cluster running on the first platform that is different from a computing cluster running the hub.

In some embodiments, the method further includes: installing the ingestion service in a first instance running on the first platform; and migrating the ingestion service to a second instance running on the second platform.

In some embodiments, upon migrating the ingestion service, the ingestion service runs on the second platform using the second profile.

In some embodiments, the second storage is a different type of storage from the first storage.

In some embodiments, the first event processing service is configured differently from the second event processing service.

In some embodiments, a non-transitory computer-readable storage medium having stored thereon computer executable instructions, which when executed by a computing device, cause the computing device to be operable for: operating an ingestion service to process messages from a set of devices that generate a first set of messages, wherein the ingestion service is configured with a first profile in a plurality of profiles for a first platform, and wherein first configuration properties in the first profile configure a first connection to first storage on the first platform to store information for the first set of messages and configure a first connection to a first event processing service on the first platform to process information in the first set of the messages; receiving a selection for a second profile in the plurality of profiles; and migrating the ingestion service to a second platform associated with the second profile, wherein second configuration properties are retrieved from the second profile for the second platform and installed on the ingestion service in the second platform to configure a second connection to second storage on the second platform and configure a second connection to a second event processing service on the second platform.

In some embodiments, an apparatus includes: one or more computer processors; and a computer-readable storage medium includes instructions for controlling the one or more computer processors to be operable for: receiving, by a computing device, a migration of an ingestion service from a first platform at a second platform, wherein the first platform is associated with a first profile and the second platform is associated with a second profile in the ingestion application; retrieving, by the computing device, second configuration properties from the second profile for the second platform; installing, by the computing device, the second configuration properties on the ingestion service in the second platform to configure a connection to second storage on the second platform and configure a connection to a second event processing service on the second platform; and operating, by the computing device, the ingestion service to process messages from a set of devices that generate a first set of messages.

In some embodiments, the instructions are further operable for: receiving messages from the set of devices; and sending information from the messages to the second storage on the second platform or the second event service on the second platform.

In some embodiments, before migration, the ingestion service is configured with a first profile for the first platform, and first configuration properties in the first profile configure a connection to first storage on the first platform to store information for the first set of messages and configure a connection to a first event processing service on the first platform to process information in the first set of the messages.

System

FIG. 6 illustrates hardware of a special purpose computing machine according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610, clients 615, or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    operating, by a computing device, an ingestion service to process messages from a set of devices that generate a first set of messages, wherein the ingestion service is configured with a first profile in a plurality of profiles for a first platform, and wherein first configuration properties in the first profile configure a first connection to first storage on the first platform to store information for the first set of messages and configure a first connection to a first event processing service on the first platform to process information in the first set of the messages;
    receiving, by the computing device, a selection for a second profile in the plurality of profiles; and
    migrating, by the computing device, the ingestion service to a second platform associated with the second profile, wherein second configuration properties are retrieved from the second profile for the second platform and installed on the ingestion service in the second platform to configure a second connection to second storage on the second platform and configure a second connection to a second event processing service on the second platform, wherein the first platform and second platform are different cloud platforms and the first configuration properties include one or more of an endpoint uniform resource locator, an access key, a secret key, a bucket key and storage, and second configuration properties include one or more of a credential file path, a resource group, a region and storage account.

2. The method of claim 1, further comprising:
    prior to operating the ingestion service:
    receiving a selection for the first profile in the plurality of profiles;
    retrieving configuration properties for the first platform from the first profile; and
    installing the configuration properties for the first platform on the ingestion service to configure the first connection to the first storage on the first platform and configure the second connection the first event service on the first platform.

3. The method of claim 1, wherein the ingestion service stores the first configuration properties for the first profile and the second configuration properties for the second profile.

4. The method of claim 1, further comprising:
    receiving messages from the set of devices; and
    sending information from the messages to the first storage on the first platform or the first event service on the first platform.

5. The method of claim 1, further comprising:
    receiving messages from the set of devices; and
    performing one or more tasks on information from the messages.

6. The method of claim 5, further comprising:
    storing information in the first storage based on performing the one or more tasks.

7. The method of claim 5, further comprising:
    processing the information at the first event service based on a set of rules.

8. The method of claim 1, further comprising:
    upon migrating the ingestion service:
    receiving messages from the set of devices; and
    sending information from the messages to the second storage on the second platform or the second event service on the second platform.

9. The method of claim 8, further comprising:
    storing information in the second storage based on performing the one or more tasks.

10. The method of claim 8, further comprising:
    sending information to the second event service based on performing the one or more tasks.

11. The method of claim 1, further comprising:
    connecting to a hub that is a connection point for the set of devices to receive messages from the set of devices via the hub.

12. The method of claim 1, further comprising:
    installing the ingestion service in a computing cluster running on the first platform that is different from a computing cluster running the hub.

13. The method of claim 1, further comprising:
    installing the ingestion service in a first instance running on the first platform; and
    migrating the ingestion service to a second instance running on the second platform.

14. The method of claim 1, wherein upon migrating the ingestion service, the ingestion service runs on the second platform using the second profile.

15. The method of claim 1, wherein the second storage is a different type of storage from the first storage.

16. The method of claim 1, wherein the first event processing service is configured differently from the second event processing service.

17. A non-transitory computer-readable storage medium having stored thereon computer executable instructions, which when executed by a computing device, cause the computing device to be operable for:

operating an ingestion service to process messages from a set of devices that generate a first set of messages, wherein the ingestion service is configured with a first profile in a plurality of profiles for a first platform, and wherein first configuration properties in the first profile configure a first connection to first storage on the first platform to store information for the first set of messages and configure a first connection to a first event processing service on the first platform to process information in the first set of the messages;

receiving a selection for a second profile in the plurality of profiles; and migrating the ingestion service to a second platform associated with the second profile, wherein second configuration properties are retrieved from the second profile for the second platform and installed on the ingestion service in the second platform to configure a second connection to second storage on the second platform and configure a second connection to a second event processing service on the second platform, wherein the first platform and second platform are different cloud platforms and the first configuration properties include one or more of an endpoint uniform resource locator, an access key, a secret key, a bucket key and storage, and second configuration properties include one or more of a credential file path, a resource group, a region and storage account.

18. An apparatus comprising:
one or more computer processors; and
a computer-readable storage medium comprising instructions for controlling the one or more computer processors to be operable for:
receiving, by a computing device, a migration of an ingestion service from a first platform at a second platform, wherein the first platform is associated with a first profile and the second platform is associated with a second profile in the ingestion application;
retrieving, by the computing device, second configuration properties from the second profile for the second platform:
installing, by the computing device, the second configuration properties on the ingestion service in the second platform to configure a connection to second storage on the second platform and configure a connection to a second event processing service on the second platform; and
operating, by the computing device, the ingestion service to process messages from a set of devices that generate a first set of messages, wherein the first platform and second platform are different cloud platforms and the first configuration properties include one or more of an end point uniform resource locator, an access key, a secret key, a bucket key and storage, and second configuration properties include one or more of a credential file path, a resource group, a region and storage account.

19. The apparatus of claim 18, further operable for:
receiving messages from the set of devices; and
sending information from the messages to the second storage on the second platform or the second event service on the second platform.

20. The apparatus of claim 18, wherein:
before migration, the ingestion service is configured with a first profile for the first platform, and
first configuration properties in the first profile configure a connection to first storage on the first platform to store information for the first set of messages and configure a connection to a first event processing service on the first platform to process information in the first set of the messages.

* * * * *